United States Patent
Lombardini

(10) Patent No.: US 8,070,900 B2
(45) Date of Patent: Dec. 6, 2011

(54) PROCESS FOR THE PRODUCTION OF A BLISTER SHEET

(75) Inventor: Francesco Lombardini, Nibbia Novara (IT)

(73) Assignee: Gruppo Colines S.r.l., Novara (IT)

( * ) Notice: Subject to any disclaimer, the term of this patent is extended or adjusted under 35 U.S.C. 154(b) by 844 days.

(21) Appl. No.: 10/544,363

(22) PCT Filed: Apr. 25, 2005

(86) PCT No.: PCT/EP2005/004503
§ 371 (c)(1),
(2), (4) Date: Aug. 3, 2005

(87) PCT Pub. No.: WO2005/105436
PCT Pub. Date: Nov. 10, 2005

(65) Prior Publication Data
US 2006/0054531 A1    Mar. 16, 2006

(30) Foreign Application Priority Data
Apr. 30, 2004    (IT) .............................. MI2004A0866

(51) Int. Cl.
*B29C 47/06* (2006.01)
(52) U.S. Cl. ................... 156/199; 156/210; 156/244.22; 156/244.26
(58) Field of Classification Search .................. None
See application file for complete search history.

(56) References Cited

U.S. PATENT DOCUMENTS

| 3,682,736 | A |   | 8/1972 | Akamatsu |   |
|---|---|---|---|---|---|
| 3,811,987 | A |   | 5/1974 | Wilkinson et al. |   |
| 3,889,039 | A | * | 6/1975 | Wainer | 428/404 |
| 4,612,238 | A | * | 9/1986 | DellaVecchia et al. | 442/180 |
| 4,858,139 | A | * | 8/1989 | Wirtz | 700/196 |
| 5,186,876 | A | * | 2/1993 | Purstinger et al. | 264/40.6 |
| 5,196,254 | A | * | 3/1993 | Akiyama | 428/178 |
| 6,004,651 | A |   | 12/1999 | von Montgelas et al. |   |
| 2002/0170662 | A1 |   | 11/2002 | Schauf |   |
| 2003/0194575 | A1 | * | 10/2003 | Tau et al. | 428/515 |
| 2004/0096628 | A1 |   | 5/2004 | Saathoff et al. |   |

FOREIGN PATENT DOCUMENTS

| DE | 44 47 239 | 7/1995 |
| EP | 0 325 780 | 8/1989 |
| GB | 1 382 436 | 1/1975 |

OTHER PUBLICATIONS http://plastics.bayer.com/plastics/emea/en/product/apec/product_datasheets/Apec_1803_ASTM/gradeld-9077/datasheethtml.jsp Jul. 14, 2010.*
Notification of Transmittal of the International Search Report.

* cited by examiner

*Primary Examiner* — John L. Goff
*Assistant Examiner* — Barbara J. Musser
(74) *Attorney, Agent, or Firm* — Hedman & Costigan, P.C.; James V. Costigan

(57) ABSTRACT

Process for the production of a blister sheet which comprises the following steps:
  a) extrusion of a bottom film, a central film, a top film starting from the corresponding granule;
  b) thermoforming of the central film;
  c) calibration and partial cooling of the bottom and top films;
  d) heating of at least one side of the bottom and top films and coupling of the two bottom and top films with the thermoformed film.

6 Claims, 2 Drawing Sheets

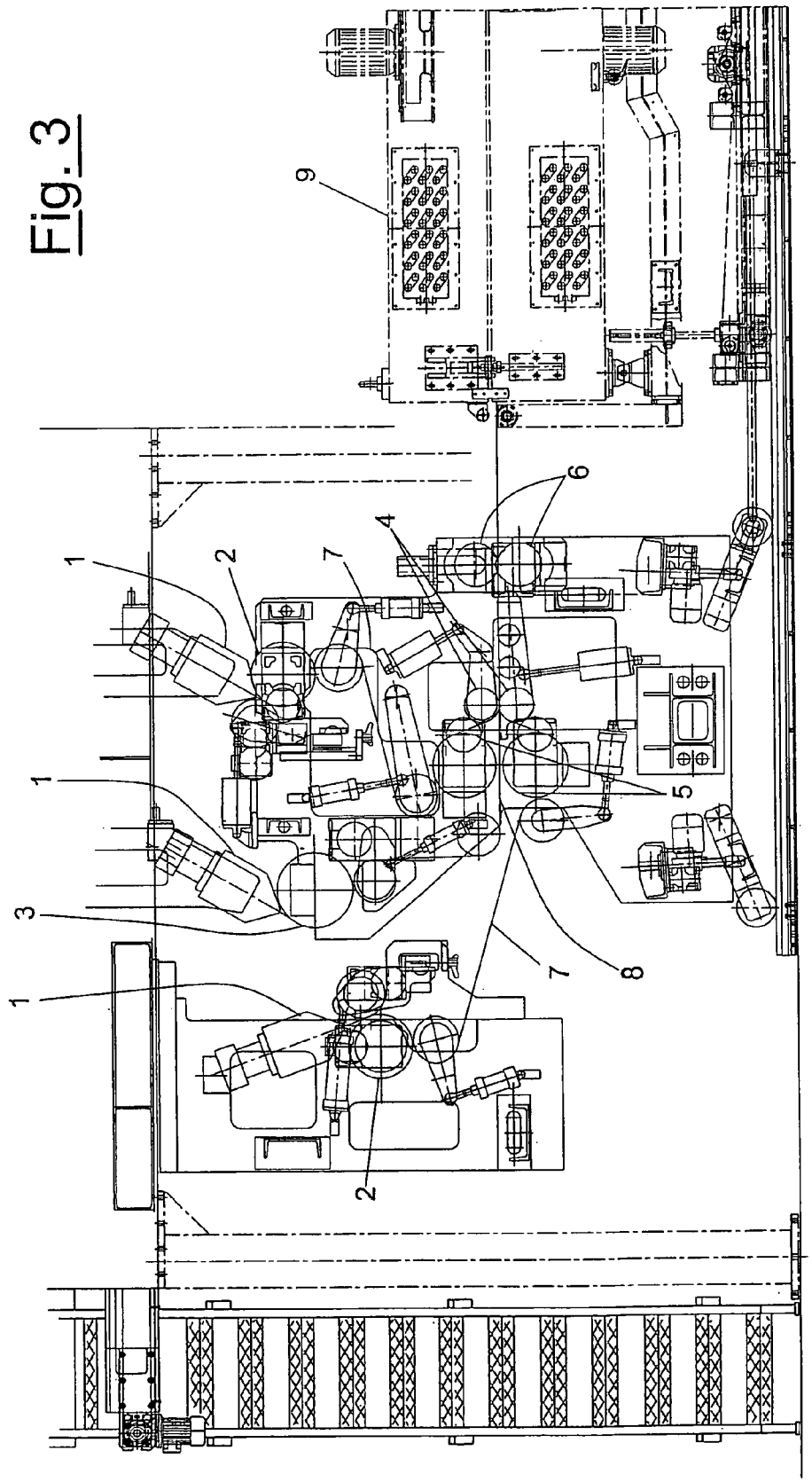

PROCESS FOR THE PRODUCTION OF A BLISTER SHEET

The present invention relates to a process and apparatus for the production of a blister sheet, in particular made of polypropylene.

A blister sheet refers to a polypropylene honeycomb sheet which can have basis weights, i.e. weight per square meter, varying from 300 to 3,000 g/m$^2$ approximately. This product has specific characteristics such as a considerable rigidity and hardness, even if it has a good resilience (i.e. breaking strength). It also has a filling factor, i.e. a ratio between the volume of plastic material with respect to the whole volume occupied by the product, of 30±50%.

Thanks to this specific honeycomb structure, the bubble sheet has a particularly interesting resistance/specific weight ratio; in particular, this characteristic is of particular interest and importance in the packaging industry in which there is a specific tendency to progressively reduce the weight of the packaging product, thus eliminating the overpackaging phenomenon.

The current state of the art describes and uses bubble sheets which schematically consist of the hot joining of three different films, of which one (the central film) is a thermoformed film. Due to the thermoforming, the central film acquires a honeycomb-form characteristic, thus guaranteeing a considerable increase in the static moment of inertia in the three directions and therefore increasing the relative resistance moduli.

A schematic representation of the product according to the state of the art is provided in FIG. 1, which illustrates an upper or top film, a central thermoformed film and a lower or bottom film. The particular conformation of the central film gives the final product the mechanical properties (rigidity, load resistance, etc.) and functional characteristics (lightness, malleability, etc.), which over recent years have led to the use of a bubble sheet such as that represented in FIG. 1 and analogous products in various applications, with excellent results.

The production of the blister sheet described above, however, has various drawbacks. The processes currently used for the production of blister sheets are, in fact, extremely complex production processes, which have high costs and are not particularly compatible with present industrial demands.

There are essentially two processes currently used for the production of blister sheets with a honeycomb structure, made up of three different films, comprising a central thermoformed film; they have a basic difference: in the first case, the production process is a batch process, i.e. off-line, whereas in the second case, the production process is a continuous process which, however, does not allow an end-product to be obtained of an adequate quality. The blister sheet obtained does in fact lack some of its specific characteristics which ensure its versatility.

The first process according to the state of the art, which is a batch process, starts from three films having an identical internal structure (generally single-layered, i.e. consisting of a single material), already wound onto bobbins. As starting products, it uses products which have been previously produced on another specific plant.

The film forming the central layer is then unwound, heated and thermoformed by a specific conforming roll, by means of mechanical action or with the creation of a vacuum, whereas the two films to be coupled with the central film as top and bottom, are in turn unwound and heated to a temperature higher than the softening temperature of the material ("vicat" temperature) and subsequently adhere to the thermoformed film by the mechanical action of two pressing rolls.

The product thus obtained is a bubble sheet analogous to that represented in FIG. 1.

This process has various problems and drawbacks. First of all, various passages are necessary for obtaining the bubble sheet: the process envisages a first extrusion passage of the three flat films, with a consequent consumption of thermal/electric energy, followed by their cooling (with the use of further energy), storage of the supplies on bobbins (a continuous process such as extrusion passes to a batch process), a second heating and cooling of the three films to effect the thermoforming and coupling with a further considerable increase in time and costs. The energy balance of the whole process is evidently not at all convenient.

Furthermore, in order to satisfy the clients' requests in terms of basis weights (i.e. thickness), colour, etc. which depend on the characteristics required by the blister sheet, it is necessary to have a warehouse well supplied with single film bobbins, i.e. a warehouse which is logistically and economically extremely onerous. The necessity of acquiring and maintaining such a vast warehouse of basis weights and types of film also results in an increase in transportation costs. This process also lacks convenience due to the high quantity of production scraps, which are obviously produced at every bobbin change of the single films (i.e. each time the batch process restarts), and are also produced by the cutting of the edges of the end-product, said cutting being necessary for ensuring that the bubble sheet also satisfies certain aesthetic and not only physico-mechanical requisites.

The second process in use according to the state of the art is a continuous process essentially based on the cast technology, i.e. it envisages the extrusion of a flat plastic film, cooled by means of a cylinder kept at a low temperature by the circulation of water or another cooling liquid.

The quality of the bubble sheets obtained with this second process, however, is insufficient both with respect to the mechanical characteristics and also the outer appearance. This poor end-quality obviously also influences the possibility of use of the product for certain applications.

The process in continuous according to the state of the art can be schematically described as follows: there is the contemporaneous extrusion of two films, one of which is poured directly onto a cooled conforming cylinder, which has the negatives of the honeycombs, inside which a vacuum is created with specific pumps.

The film is thus thermoformed by exploiting its own caloric content deriving from the extrusion and consequently eliminating the necessity of having to heat it a second time; the lower film which forms the bottom is extruded contemporaneously, as specified above, and then poured directly onto the rear part of the thermoformed film, instantly adhering to it also thanks to a pressing roll which increases the contact pressure, thus facilitating the adhesion.

The very fact that the bottom is adhered to the thermoformed film when this is still at a high temperature (especially in the case of high basis weights, i.e. when the caloric content of the film is very high and is not completely absorbed by the conforming cylinder), causes, however, deformation of the product. In particular, it can be observed that the edges of the bubbles become more evident, which considerably limits the planarity of the end-product, causing negative effects when the bubble sheet must be coupled with other products, such as for example, TNT, paper, aluminum, etc.

Secondly, the film forming the upper or top layer comes from bobbins of film already formed and is coupled discontinuously. It must therefore be heated (repeating the problem of energy consumption) and adhered by means of a mechanical pressing roll system, to the thermoformed film; the latter, in turn, must be heated again to facilitate adhesion, with a further energy waste.

This process, moreover, has an additional, indirect and even more serious problem; the coupling of the third layer, in fact, is effected when the bottom film is already completely cold, and there is therefore a thermal unbalancing of the whole bubble sheet. The upper part, in fact, has a temperature close to the vicat value whereas the lower part has a temperature approximately equal to room temperature.

This fact inevitably creates internal tension which must be minimized with the use of a specific oven, which "relaxes" the whole product, stabilizing and annulling, at least theoretically, the residual tension. In practice, however, it is not at all easy to obtain a satisfactory result, above all when the final basis weight of the bubble sheet must be frequently varied. This variation of the basis weight does in fact require different operating conditions which can only be reached after a certain transitory period in which there is a consequent high product of waste product.

Furthermore, this second process according to the state of the art also comprises two distinct and successive phases which create a considerable energy waste and an end quality of the product which is not always suitable for the final use.

The Applicant has now surprisingly found that the particular process according to the present invention allows the drawbacks of the state of the art to be overcome.

An object of the present invention therefore relates to a process for the production of a blister sheet which envisages the following passages:
a) extrusion of an upper or bottom film, a central film, and a lower or top film, starting from the corresponding granule;
b) thermoforming of the central film;
c) calibration and partial cooling of the bottom and top films;
d) heating of at least one side of the bottom and top films and coupling of the two bottom and top films with the thermoformed film.

A further object of the present invention relates to a device for producing a blister sheet which comprises at least three extrusion heads, which form the extrusion group, followed by a thermoforming group and calibration and cooling groups, the thermoforming group and the calibration and cooling groups being in turn connected to a coupling group.

An object of the present invention also relates to the use of the blister sheet obtained with the process according to the present invention as a protection element or packaging element.

Each of the extruded films preferably consists of at least three layers.

The main advantage of the process according to the present invention consists in the production of the blister sheet in a single production phase, with a consequent lower energy consumption and, indirectly, with a lower environmental impact mainly due to the drastic reduction in waste products.

A further advantage is represented by the absence of delamination, thanks to the absolute adhesion guaranteed by the very fact that each single film forming the sheet consists of three layers contemporaneously extruded by means of a coextrusion process.

In this way, it is also possible to limit, or even completely eliminate, another problem present in the processes according to the state of the art, i.e. the necessity of finding a mixture of materials which has good physico-mechanical characteristics and at the same time allows coupling at relatively low temperatures, without the danger of detachment between the three films composing the blister sheet.

A mixture of this kind is obviously the result of a compromise between the requirements of the production process and the characteristics of the end-product, i.e. the blister sheet, but as it is a compromise, it cannot of course satisfy both demands at 100%.

BRIEF DESCRIPTION OF THE SEVERAL VIEWS OF THE DRAWINGS

FIG. 3 is a schematic view of a e for the production of the invention.

In particular, the blister sheet which can be obtained by means of the process according to the present invention consists of an upper or head film, a central thermoformed film and a lower or bottom film.

Figure 1:
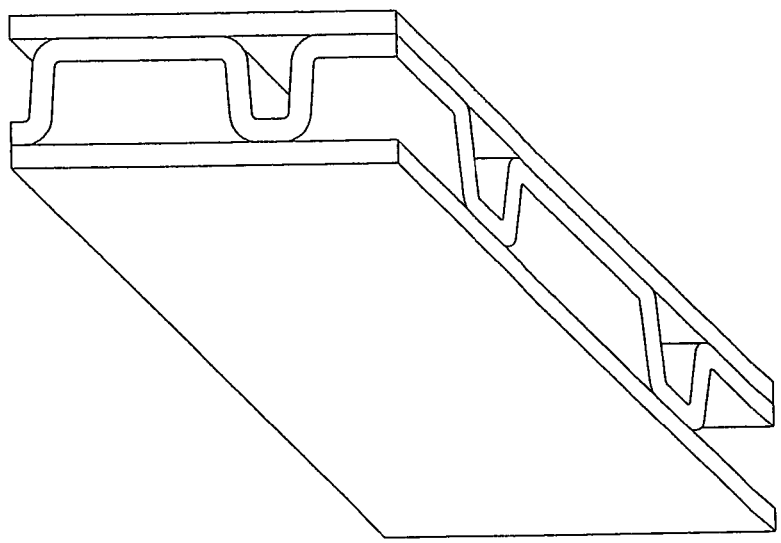
FIG. 1 is a schematic representation of a prior blister sheet.
Figure 2:
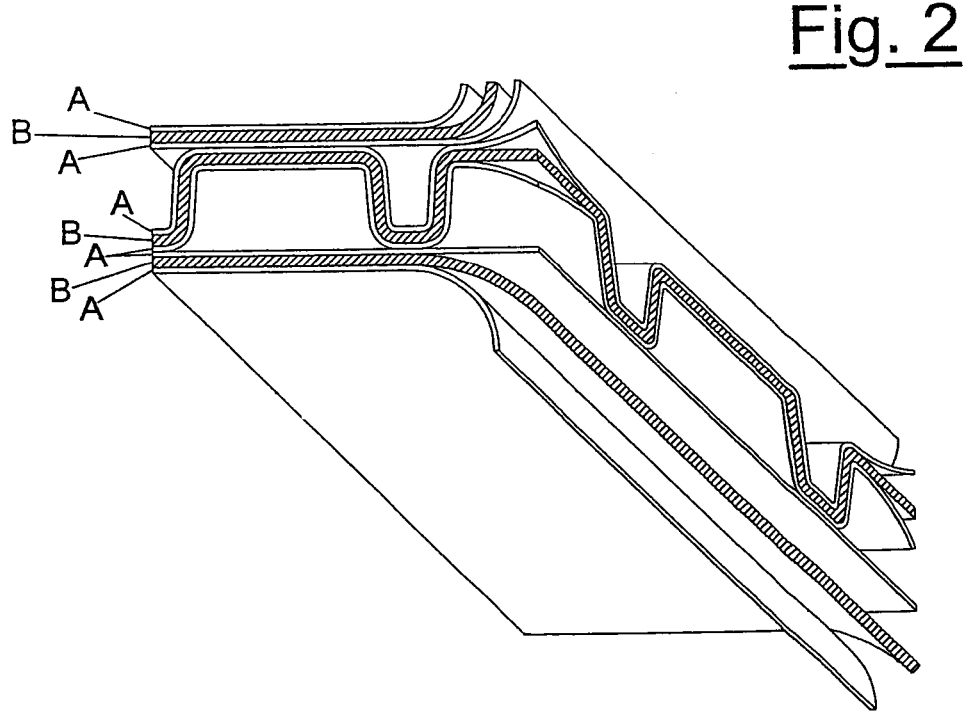
FIG. 2 is a perspective view of a section of a blister sheet according to the invention which has the three top and the three bottom layers partially peeled away.

Each single film preferably consists of three layers, according to the structure A-B-A, as represented in FIG. 2, in which the outer A layers consist of a copolymer polypropylene film (preferably a block or random polypropylene copolymer, with ethylene and/or butene monomers inserted in the propylene chains), having chemical properties which make it particularly suitable for high temperature coupling, at the same time ensuring adhesion and a relatively low welding temperature.

The inner layer B consists of a homopolymer polypropylene film, i.e. consisting of propylene monomers, having particularly high physico-mechanical characteristics, and therefore suitable for guaranteeing the end-product, i.e. the blister sheet, qualities desired from the point of view of mechanical resistance and lightness.

In particular, the thermoforming passage b) envisages that the central film be maintained at a temperature close to the vicat value (a value which is strictly related to the type of polymer), so as to allow it to be thermoformed without problems. A temperature close to the vicat value refers to a temperature ranging from the vicat temperature to a temperature about 5° C. lower than the vicat temperature.

It is not then completely cooled.

The calibration and partial cooling phase c) of the bottom and top films envisages the calibration of said films in relation to the characteristics required for the end-product using a series of calenders. In particular, the calibration and partial cooling phase c) comprises the calibration of said films at a variable thickness in relation to the final basis weight required and in any case ranging from 100 to 1,000 µm approximately. Said calenders cool the bottom and top films to a temperature lower than the vicat value, as close as possible thereto, in particular to a temperature ranging from the vicat temperature and a temperature 5° C. lower than the vicat value.

The calenders however do not completely absorb the caloric content of the two films.

At the end of the extrusion, thermoforming, calibration and partial cooling phases a)-c); the three films are completely crystallized and are therefore non-deformable in the absence of mechanical action, but are still relatively hot.

Phase d) therefore envisages the heating of at least one side of the bottom and top films with the use of a limited quantity of heat to effect the simultaneous coupling of the top and bottom films with the central thermoformed film by means of two pressing rolls.

Further advantages of the process for the production of the blister sheet according to the present invention are: in the first place, it is a continuous process which starts from the granule and directly produces the finished product without intermediate passages. A bobbin warehouse is consequently not necessary, with relative economical advantages both from a logistic and transportation point of view.

It is also possible to directly produce any basis weight required (obviously within a defined variation range) and with any colouring, practically "just in time", with a minimum waste product for obtaining the thickness variation.

The process according to the present invention also allows a considerable energy saving deriving from the necessity of only slightly heating the two top and bottom films, thanks to the sufficiently high caloric content maintained close to the coupling with the blister, i.e. with the central thermoformed film.

The process according to the present invention also has the further advantage of envisaging the use of materials having high mechanical properties as the central layer of the three films (i.e. layer B), without influencing the weldability of the single films.

It is also possible to use materials having high weldability characteristics as outer layers of the three films (i.e. layers A), without influencing the mechanical properties of the end-product.

Furthermore, the process according to the present invention has the undoubted advantage of minimizing scraps both during the starting operations, as it is a continuous process, and above all under regime conditions, thanks to the possibility of recycling the edges cut for feeding the extruder of the layers B, without significant variations in the characteristics of the end-product.

The blister sheet obtained with the process according to the present invention is also characterized by the complete absence of residual internal tensions, above all in the case of films with a symmetrical structure (i.e. where the thicknesses of the top and bottom films are substantially the same), thanks to the contemporaneous coupling with the central blister, i.e. with the thermoformed layer, and therefore with identical thermal conditions.

Furthermore, the blister sheet has a high planarity, thanks to the coupling of the films effected at temperatures close to the vicat value and thanks to the use of specific materials for the outer layers A, materials which allow a considerable adhesion also in the presence of relatively limited contact pressures.

Finally, the process according to the present invention allows to produce, without any problems, films with a high basis weight thanks to the calender calibration of the top and bottom films.

The characteristics and advantages of a process according to the present invention will appear more evident from the following illustrative and non-limiting description, referring to the schematic drawing enclosed (FIG. 3) which represents a raised side view of a device for the production of a blister sheet according to the present invention.

FIG. 3, in fact, represents the scheme of a device for embodying the production process of the blister sheet with particular reference to the area of the extrusion and coupling heads of the three films.

With reference to FIG. 3, this indicates with 1 the extrusion heads, with 2 the calenders of the calibration group, with 3 the thermoforming conforming cylinder, with 4 the pressing groups for the coupling, with 5 the post-heating cylinders, with 6 the pulling cylinders, with 7 the top and bottom films A, with 8 the thermoformed film B and with 9 a tempering oven.

These groups are not described in greater detail as they are well known to experts in the field.

The calibration and cooling group of the top and bottom films operates by means of calenders (2) and guarantees an excellent dimensional tolerance. It allows, in fact, the production of films having a wide basis weight range, by simply acting on the distance between the casting calenders, with the creation of a small meniscus of material in correspondence with their tangent, as well as obviously on the rate of the line. As already mentioned, said calenders provide for the complete crystallization of the top and bottom polypropylene films, in very short times, thus inhibiting the typical "spot" configuration which is generated in the case of crystallization which is too slow or only partial. Above all in the case of high basis weights, the caloric content of the top and bottom films, however, is not completely absorbed.

This passage is fundamental for the process according to the present invention which is specifically based on the possibility of exploiting part of the heat supplied to the film during extrusion, to effect its coupling with the blister or central thermoformed film; the latter is analogously formed in the traditional way, by means of a conforming cylinder (3) cooled and with internal suction which brings the central film (8) to a temperature lower than the vicat temperature, also preserving, however, in this case, a part of the caloric content of the central film.

The film run (i. e. the path followed by the top, bottom and central films) is extremely important and is effected so that the top and bottom films (7) approach the post-heating cylinders (5) under the best possible conditions. This means that the top and bottom films (7) reach the post-heating cylinders (5) at such a temperature as to directly allow the coupling or in any case require the least possible quantity of heat for effecting the coupling. The coupling is effected contemporaneously for the two outer films, by means of two pressing rolls (4), the product is then pulled from another pair of rolls or pulling cylinders (6).

The bottom and top films preferably reach the coupling with the central thermoformed film with a film run or feeding path of the film having substantially the same length.

The central thermoforming group and the two side calibration and cooling groups subsequently feed the three films to the coupling group where the lengths of the film run or feeding paths are substantially the same.

After the coupling, there can also be a tempering oven (9), useful when blister sheets with a strongly asymmetrical structure are to be produced, i.e. which envisage a bottom film which is very different from the top film, a structural difference which could lead to the creation of residual internal tensions due to the different caloric contents of the two films and therefore different cooling rates.

The invention claimed is:

1. A process for the production of a blister sheet which comprises the following steps:
    a) extrusion of a bottom film, a central film, a top film starting from the corresponding granule;
    b) thermoforming of the central film to form a thermoformed film having a top and a bottom surface while maintaining the central film at a temperature ranging from the vicat temperature to a temperature 5° lower than the vicat temperature;
    c) calibration and partially cooling of the bottom and top films to crystallize the bottom and top films so that they are non-deformable in the absence of mechanical action, thereafter heating at least one side of the bottom and top films, and thereafter coupling the bottom and top films to the top and bottom surface of said thermoformed film with pressing wherein said coupling of the top and bottom films with the central thermoformed film is simultaneous wherein each of the film components is a multilayer structure of at least three layers and each of the film components is a multilayer structure produced in coextrusion with three layers, wherein the coextruded three-layer structure consists of an internal polypropylene homopolymer layer and two outer polypropylene copolymer layers.

2. The process according to claim 1, characterized in that the random or block copolymer outer polypropylene copolymer layers are made of a consisting of repetitive units of propylene and ethylene and/or butene monomers.

3. The process according to claim 1, characterized in that the calibration and partial cooling phase c) of the bottom and top films envisages their calibration at a thickness ranging from 100 to 1,000 μm approximately.

4. The process according to claim 1, characterized in that the calibration and partial cooling phase c) of the bottom and top films are cooled to a temperature ranging from the vicat temperature and a temperature 5° C. lower than the vicat temperature.

5. The process according to claim 1, characterized in that the bottom and top films reach a point where coupling with the central thermoformed film takes place by passing said bottom and top films to said point along a feeding path having a length substantially equal to the length of the film run from the extruder to said coupling point.

6. A process for the production of a blister sheet which consists of the following steps:
   a) extrusion of a bottom film, a central film, a top film starting from the corresponding granule;
   b) thermoforming of the central film to form a thermoformed film having a top and a bottom surface while maintaining the central film at a temperature ranging from the vicat temperature to a temperature 5° lower than the vicat temperature;
   c) calibration and partially cooling of the bottom and top films to crystallize the bottom and top films so that they are non-deformable in the absence of mechanical action, thereafter heating at least one side of the bottom and top films, and thereafter coupling the bottom and top films to the top and bottom surface of said thermoformed film with pressing wherein said coupling of the top and bottom films with the central thermoformed film is simultaneous wherein each of the film components is a multilayer structure of at least three layers and each of the film components is a multilayer structure produced in coextrusion with three layers, wherein the coextruded three-layer structure consists of an internal polypropylene homopolymer layer and two outer polypropylene copolymer layers.

* * * * *